(12) United States Patent
Woodell et al.

(10) Patent No.: US 8,077,078 B1
(45) Date of Patent: Dec. 13, 2011

(54) SYSTEM AND METHOD FOR AIRCRAFT ALTITUDE MEASUREMENT USING RADAR AND KNOWN RUNWAY POSITION

(75) Inventors: Daniel L. Woodell, Cedar Rapids, IA (US); Richard D. Jinkins, Rewey, WI (US); Richard M. Rademaker, Rijswijk (NL); Patrick D. McCusker, Walker, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 434 days.

(21) Appl. No.: 12/180,293

(22) Filed: Jul. 25, 2008

(51) Int. Cl.
*G01S 13/08* (2006.01)
*G01S 13/00* (2006.01)

(52) U.S. Cl. .......... 342/120; 342/33; 342/118; 342/175; 342/195; 340/945; 340/947; 340/951; 340/952; 701/1; 701/3; 701/4

(58) Field of Classification Search .................. 342/118, 342/120–123, 146, 147, 165–175, 192–197, 342/352, 356–358, 33–35; 701/1–18, 300–302; 340/945, 947, 951, 952
See application file for complete search history.

(56) References Cited

U.S. PATENT DOCUMENTS

| | | | |
|---|---|---|---|
| 2,930,035 A | 3/1960 | Altekruse | |
| 2,965,894 A | 12/1960 | Sweeney | |
| 2,994,966 A | 8/1961 | Senitsky et al. | |
| 3,153,234 A | 10/1964 | Begeman et al. | |
| 3,212,088 A | 10/1965 | Alexander et al. | |
| 3,241,141 A | 3/1966 | Wall | |
| 3,325,807 A | 6/1967 | Burns et al. | |
| 3,397,397 A | 8/1968 | Barney | |
| 3,680,094 A | 7/1972 | Bayle et al. | |
| 3,739,380 A | 6/1973 | Burdic et al. | |
| 3,810,175 A | 5/1974 | Bell | |
| 3,815,132 A | 6/1974 | Case, Jr. et al. | |
| 4,024,537 A | 5/1977 | Hart | |
| 4,058,710 A | 11/1977 | Altmann | |
| 4,646,244 A * | 2/1987 | Bateman et al. | 701/301 |
| 4,760,396 A | 7/1988 | Barney et al. | |
| 4,924,401 A | 5/1990 | Bice et al. | |
| 4,939,513 A * | 7/1990 | Paterson et al. | 701/8 |
| 5,047,781 A | 9/1991 | Bleakney | |
| 5,332,998 A | 7/1994 | Avignon et al. | |
| 5,345,241 A * | 9/1994 | Huddle | 342/120 |
| 5,559,518 A | 9/1996 | DiDomizio | |
| 5,820,080 A * | 10/1998 | Eschenbach | 701/16 |
| 5,831,570 A | 11/1998 | Ammar et al. | |
| 5,867,119 A | 2/1999 | Corrubia et al. | |
| 5,923,279 A | 7/1999 | Bamler et al. | |
| 5,945,926 A | 8/1999 | Ammar et al. | |

(Continued)

OTHER PUBLICATIONS

U.S. Appl. No. 12/167,208, filed Jul. 2, 2008, Dickerson et al.

(Continued)

*Primary Examiner* — Bernarr Gregory
(74) *Attorney, Agent, or Firm* — Daniel M. Barbieri

(57) ABSTRACT

A method of and system for determining the altitude of an aircraft can use a relative altitude estimate using information from an onboard radar. The altitude can be referenced to a runway for landing operations. The radar can produce relative altitude information from the range to the landing point and a precision estimation of the vertical angle to the landing point. The vertical angle estimate can be made with a phase processing antenna/radar system.

20 Claims, 11 Drawing Sheets

U.S. PATENT DOCUMENTS

| | | | | |
|---|---|---|---|---|
| 6,023,240 | A | 2/2000 | Sutton | |
| 6,064,942 | A | 5/2000 | Johnson et al. | |
| 6,128,553 | A | 10/2000 | Gordon et al. | |
| 6,150,901 | A | 11/2000 | Auken | |
| 6,154,151 | A | 11/2000 | McElreath et al. | |
| 6,157,891 | A * | 12/2000 | Lin | 701/301 |
| 6,163,021 | A | 12/2000 | Mickelson | |
| 6,166,661 | A | 12/2000 | Anderson et al. | |
| 6,169,770 | B1 | 1/2001 | Henely | |
| 6,178,391 | B1 | 1/2001 | Anderson et al. | |
| 6,194,980 | B1 | 2/2001 | Thon | |
| 6,201,494 | B1 | 3/2001 | Kronfeld | |
| 6,204,806 | B1 | 3/2001 | Hoech | |
| 6,259,400 | B1 | 7/2001 | Higgins et al. | |
| 6,266,114 | B1 | 7/2001 | Skarohlid | |
| 6,281,832 | B1 | 8/2001 | McElreath | |
| 6,285,298 | B1 | 9/2001 | Gordon | |
| 6,285,337 | B1 | 9/2001 | West et al. | |
| 6,285,926 | B1 | 9/2001 | Weiler et al. | |
| 6,317,872 | B1 | 11/2001 | Gee et al. | |
| 6,345,127 | B1 | 2/2002 | Mitchell | |
| 6,359,585 | B1 | 3/2002 | Bechman et al. | |
| 6,373,418 | B1 | 4/2002 | Abbey | |
| 6,374,286 | B1 | 4/2002 | Gee et al. | |
| 6,377,892 | B1 | 4/2002 | Johnson et al. | |
| 6,388,607 | B1 | 5/2002 | Woodell | |
| 6,388,608 | B1 | 5/2002 | Woodell et al. | |
| 6,421,000 | B1 | 7/2002 | McDowell | |
| 6,424,288 | B1 | 7/2002 | Woodell | |
| 6,426,717 | B1 | 7/2002 | Maloratsky | |
| 6,441,773 | B1 | 8/2002 | Kelly et al. | |
| 6,448,922 | B1 | 9/2002 | Kelly | |
| 6,452,511 | B1 | 9/2002 | Kelly et al. | |
| 6,456,236 | B1 | 9/2002 | Hauck et al. | |
| 6,462,703 | B2 * | 10/2002 | Hedrick | 342/120 |
| 6,473,240 | B1 | 10/2002 | Dehmlow | |
| 6,492,934 | B1 | 12/2002 | Hwang et al. | |
| 6,512,476 | B1 | 1/2003 | Woodell | |
| 6,520,056 | B1 | 2/2003 | Nemeth et al. | |
| 6,525,674 | B1 | 2/2003 | Kelly et al. | |
| 6,531,669 | B1 | 3/2003 | Miller et al. | |
| 6,549,161 | B1 | 4/2003 | Woodell | |
| 6,567,728 | B1 | 5/2003 | Kelly et al. | |
| 6,574,030 | B1 | 6/2003 | Mosier | |
| 6,577,947 | B1 | 6/2003 | Kronfeld et al. | |
| 6,590,528 | B1 | 7/2003 | DeWulf | |
| 6,603,425 | B1 | 8/2003 | Woodell | |
| 6,650,275 | B1 | 11/2003 | Kelly et al. | |
| 6,650,291 | B1 | 11/2003 | West et al. | |
| 6,690,298 | B1 | 2/2004 | Barber et al. | |
| 6,690,299 | B1 | 2/2004 | Suiter | |
| 6,697,008 | B1 | 2/2004 | Sternowski | |
| 6,710,663 | B1 | 3/2004 | Berquist | |
| 6,714,186 | B1 | 3/2004 | Mosier et al. | |
| 6,724,344 | B1 | 4/2004 | Stockmaster et al. | |
| 6,738,011 | B1 | 5/2004 | Evans | |
| 6,741,203 | B1 | 5/2004 | Woodell | |
| 6,741,208 | B1 | 5/2004 | West et al. | |
| 6,744,382 | B1 | 6/2004 | Lapis et al. | |
| 6,744,408 | B1 | 6/2004 | Stockmaster | |
| 6,757,624 | B1 | 6/2004 | Hwang et al. | |
| 6,771,626 | B1 | 8/2004 | Golubiewski et al. | |
| 6,782,392 | B1 | 8/2004 | Weinberger et al. | |
| 6,804,614 | B1 | 10/2004 | McGraw et al. | |
| 6,806,846 | B1 | 10/2004 | West | |
| 6,807,538 | B1 | 10/2004 | Weinberger et al. | |
| 6,813,777 | B1 | 11/2004 | Weinberger et al. | |
| 6,819,983 | B1 | 11/2004 | McGraw | |
| 6,822,617 | B1 | 11/2004 | Mather et al. | |
| 6,825,804 | B1 | 11/2004 | Doty | |
| 6,839,017 | B1 | 1/2005 | Dillman | |
| 6,850,185 | B1 | 2/2005 | Woodell | |
| 6,862,323 | B1 | 3/2005 | Loper | |
| 6,879,280 | B1 | 4/2005 | Bull et al. | |
| 6,882,302 | B1 | 4/2005 | Woodell et al. | |
| 6,918,134 | B1 | 7/2005 | Sherlock et al. | |
| 6,933,885 | B1 | 8/2005 | Stockmaster et al. | |
| 6,938,258 | B1 | 8/2005 | Weinberger et al. | |
| 6,950,062 | B1 | 9/2005 | Mather et al. | |
| 6,959,057 | B1 | 10/2005 | Tuohino | |
| 6,972,727 | B1 | 12/2005 | West et al. | |
| 6,977,608 | B1 | 12/2005 | Anderson et al. | |
| 6,995,726 | B1 | 2/2006 | West et al. | |
| 6,998,908 | B1 | 2/2006 | Sternowski | |
| 6,999,022 | B1 | 2/2006 | Vesel et al. | |
| 6,999,027 | B1 | 2/2006 | Stockmaster | |
| 7,002,546 | B1 | 2/2006 | Stuppi et al. | |
| 7,028,304 | B1 | 4/2006 | Weinberger et al. | |
| 7,034,753 | B1 | 4/2006 | Elsallal et al. | |
| 7,069,120 | B1 | 6/2006 | Koenck et al. | |
| 7,089,092 | B1 | 8/2006 | Wood et al. | |
| 7,092,645 | B1 | 8/2006 | Sternowski | |
| 7,109,912 | B1 | 9/2006 | Paramore et al. | |
| 7,109,913 | B1 | 9/2006 | Paramore et al. | |
| 7,129,885 | B1 | 10/2006 | Woodell et al. | |
| 7,145,501 | B1 * | 12/2006 | Manfred et al. | 342/120 |
| 7,148,816 | B1 | 12/2006 | Carrico | |
| 7,151,507 | B1 | 12/2006 | Herting | |
| 7,158,072 | B1 | 1/2007 | Venkatachalam et al. | |
| 7,161,525 | B1 | 1/2007 | Finley et al. | |
| 7,170,446 | B1 | 1/2007 | West et al. | |
| 7,170,959 | B1 | 1/2007 | Abbey | |
| 7,196,329 | B1 | 3/2007 | Wood et al. | |
| 7,205,933 | B1 | 4/2007 | Snodgrass | |
| 7,219,011 | B1 | 5/2007 | Barber | |
| 7,242,343 | B1 | 7/2007 | Woodell | |
| 7,250,903 | B1 | 7/2007 | McDowell | |
| 7,269,657 | B1 | 9/2007 | Alexander et al. | |
| 7,272,472 | B1 | 9/2007 | McElreath | |
| 7,292,178 | B1 | 11/2007 | Woodell et al. | |
| 7,307,583 | B1 | 12/2007 | Woodell et al. | |
| 7,373,223 | B2 * | 5/2008 | Murphy | 701/16 |
| 7,379,796 | B2 * | 5/2008 | Walsdorf et al. | 701/9 |
| 7,423,578 | B1 | 9/2008 | Tietjen | |
| 7,479,920 | B2 | 1/2009 | Niv | |
| 7,609,200 | B1 | 10/2009 | Woodell et al. | |
| 7,616,150 | B1 | 11/2009 | Woodell | |
| 7,633,430 | B1 | 12/2009 | Wichgers et al. | |
| 7,639,175 | B1 | 12/2009 | Woodell | |
| 7,783,427 | B1 | 8/2010 | Woodell et al. | |
| 7,791,529 | B2 | 9/2010 | Filias et al. | |
| 7,808,422 | B1 | 10/2010 | Woodell et al. | |
| 2003/0160718 | A1 | 8/2003 | Nagasaku | |
| 2004/0264549 | A1 | 12/2004 | Hoole | |
| 2008/0018524 | A1 | 1/2008 | Christianson | |
| 2008/0111731 | A1 | 5/2008 | Hubbard et al. | |

OTHER PUBLICATIONS

U.S. Appl. No. 12/167,200, filed Jul. 2, 2008, Woodell et al.
U.S. Appl. No. 11/863,221, filed Sep. 27, 2007, Woodell.
Notice of Allowance for U.S. Appl. No. 12/167,200, mail date Oct. 28, 2010, 5 pages.
Notice of Allowance for U.S. Appl. No. 11/863,221, mail date Aug. 2, 2010, 9 pages.
Office Action for U.S. Appl. No. 12/167,208, mail date Dec. 30, 2009, 10 pages.
Office Action for U.S. Appl. No. 12/167,208, mail date Jun. 3, 2010, 11 pages.
Office Action for U.S. Appl. No. 12/167,203, mail date Aug. 26, 2010, 9 pages.
Office Action for U.S. Appl. No. 12/167,208, mail date Oct. 19, 2010, 8 pages.
Skolnik, Merrill I., Introduction to Radar Systems, McGraw Hill Book Company, New York, 2001, 3$^{rd}$ edition, pp. 234-236.
Technical Standard Order, TSO-C115b, Airborne Area Navigation Equipment Using Multi-Sensor Inputs, Sep. 30, 1994, 11 pages, Department of Transportation, Federal Aviation Administration, Washington, DC.

* cited by examiner

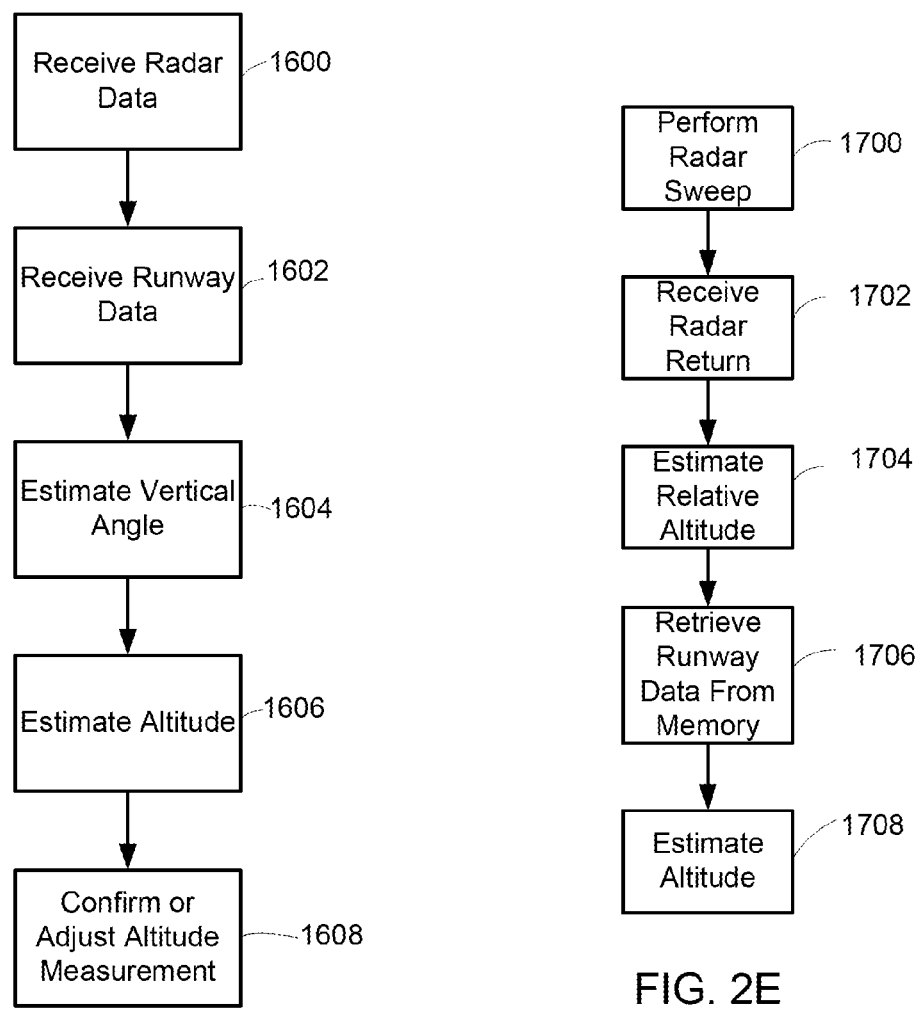

SYSTEM AND METHOD FOR AIRCRAFT ALTITUDE MEASUREMENT USING RADAR AND KNOWN RUNWAY POSITION

CROSS-REFERENCE TO RELATED APPLICATIONS

This application is related to U.S. patent application Ser. No. 11/863,215, now U.S. Pat. No. 7,639,175, entitled "METHOD AND APPARATUS FOR ESTIMATING TERRAIN ELEVATION USING A NULL RESPONSE", filed on Sep. 27, 2007 by Woodell, U.S. patent application Ser. No. 11/863,219, now U.S. Pat. No. 7,616,150, entitled "NULL STEERING SYSTEM AND METHOD FOR TERRAIN ESTIMATION", filed on Sep. 27, 2007, by Woodell, U.S. patent application Ser. No. 11/863,221, now U.S. Pat. No. 7,843,380, entitled "HALF APERTURE ANTENNA RESOLUTION SYSTEM AND METHOD", filed on Sep. 27, 2007 by Woodell, U.S. patent application Ser. No. 12/167,203, entitled "SYSTEM AND METHOD OF SEQUENTIAL LOBING USING LESS THAN FULL APERTURE ANTENNA TECHNIQUES", filed on Jul. 2, 2008 by Woodell, and U.S. patent application Ser. No. 12/167,200, now U.S. Pat. No. 7,889,117 entitled "LESS THAN FULL APERTURE HIGH RESOLUTION PHASE PROCESS FOR TERRAIN ELEVATION ESTIMATION" filed on Jul. 2, 2008 by Woodell, et al., all assigned to the Assignee of this patent application and incorporated in their entireties herein by reference.

BACKGROUND

The present application relates generally to the field of altitude estimation systems. More specifically, the application relates to method for increased accuracy of altitude estimations.

Altitude estimation systems conventionally provide flight crews with an estimation of an aircraft's current altitude. Altitude estimation systems may be implemented using barometer systems and/or global positioning systems (GPS). Barometer and GPS based systems are subject to inaccuracies, limiting their usefulness during runway approach and landing.

During the final phase of approach and landing, high accuracy altitude information is needed. GPS and barometer based systems lack the accuracy needed for reliable approach and landing estimations. For example, GPS based systems may only be accurate to within 200 feet without additional equipment.

Furthermore, high accuracy altitude information is required for synthetic vision aided landings. On-board systems lack the required accuracy for synthetic vision aided landings. To obtain the altitude accuracy needed for synthetic vision aided landings, airports conventionally use additional augmentation systems specific to that airport. As a result, synthetic vision aided landings are only possible at some airports.

Therefore, there is a need for an altitude estimation system and method that may more accurately predict altitude during approach and landing, without the aid of additional equipment. There is also a need for a generic system and method of accurately estimating altitude for use in synthetic vision aided landings, regardless of location.

SUMMARY

One embodiment of the disclosure relates to a method of determining an altitude of an aircraft based on an altitude of a runway and a radar sweep by a radar system. The method includes receiving first data associated with the aircraft position, receiving second data associated with runway position and runway altitude, and receiving third data associated with a radar return from the runway. The method also includes determining range from aircraft to runway using first and second data, measuring the vertical angle between the runway and the aircraft using the third data and determining the altitude of the aircraft based on the vertical angle, range, and runway altitude.

Another embodiment of the disclosure relates to an aircraft radar system, including an antenna configured to receive a radar return from a runway based on a radar sweep. The aircraft radar system may also include processing electronics determining the relative altitude using the angle associated with the radar return and range between the runway and the aircraft. The processing electronics may also determine an altitude of the aircraft based on the relative altitude between the runway and the aircraft summed with the altitude of the runway.

A further embodiment of the disclosure relates to an apparatus including means for receiving first data associated with aircraft position, means for receiving second data associated runway position and runway altitude, and means for receiving third data associated with a radar return from the runway. The apparatus also includes means for determining a range from aircraft to runway using first and second data, means for measuring the vertical angle between the runway and the aircraft using the third data and means for determining the altitude of the aircraft based on angle and the vertical angle, range and the runway altitude.

BRIEF DESCRIPTION OF THE DRAWINGS

The invention will become more fully understood from the following detailed description, taken in conjunction with the accompanying drawings, wherein like reference numerals refer to like elements, in which:

FIG. 2D is a flow chart of a process for confirming or adjusting sensed altitude based on the determined altitude, according to an exemplary embodiment;

FIG. 2E is a flow chart of a process for determining altitude, according to an exemplary embodiment;

DETAILED DESCRIPTION OF THE PREFERRED EMBODIMENTS

Figure 1:
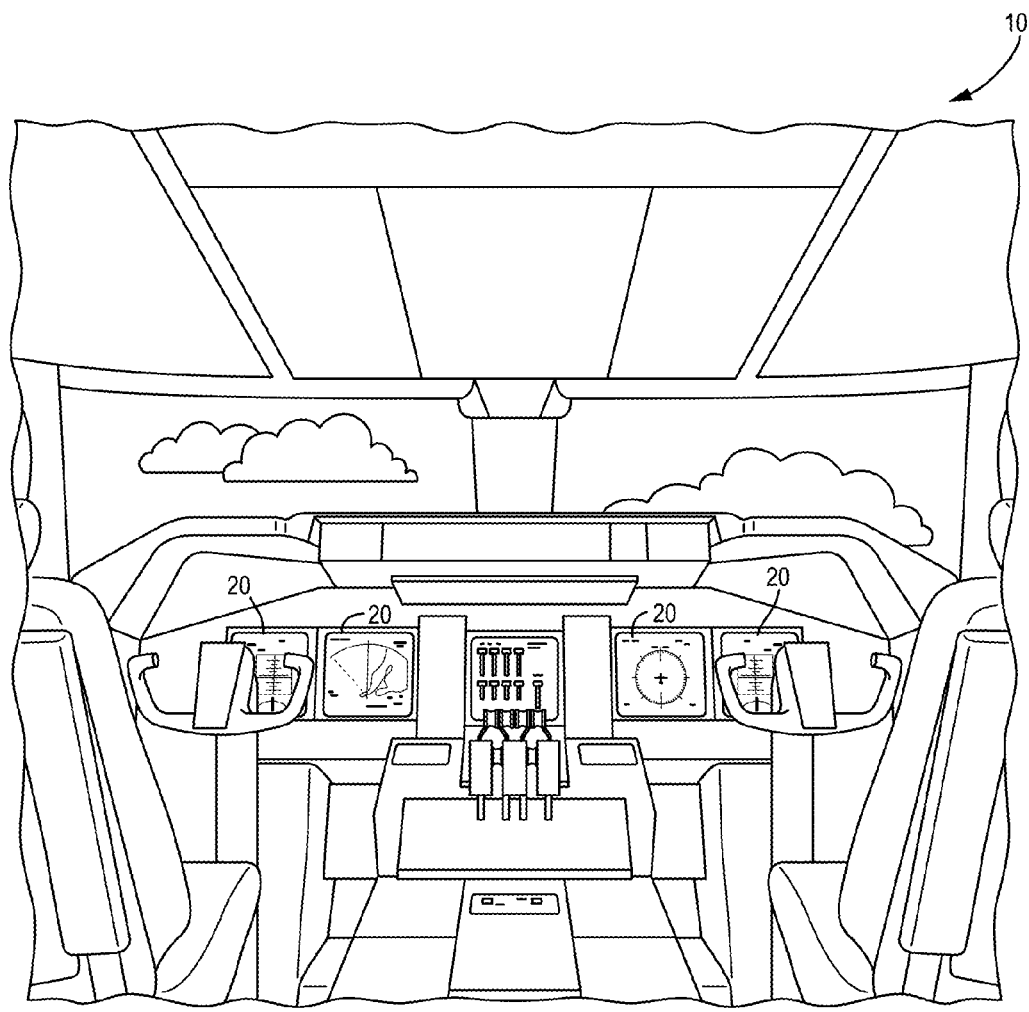
FIG. 1 is an illustration of an aircraft control center, according to an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, an illustration of an aircraft control center or cockpit 10 is shown, according to one exemplary embodiment. Aircraft control center 10 includes flight displays 20 which are used to increase visual range and to enhance decision-making abilities. In an exemplary embodiment, flight displays 20 may provide an output from a radar system of the aircraft. Flight display 20 may provide altitude information and/or synthetic vision information. In a preferred embodiment, display 20 provides altitude information calculated according to the advantageous process described below. The altitude information can be calculated using the altitude of the runway and radar returns during the final phase of flight.

Figure 2A:
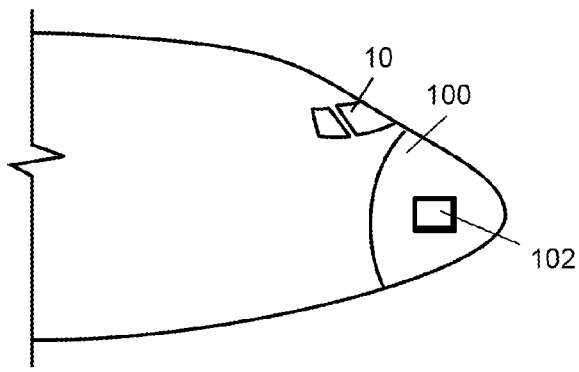
FIG. 2A is an illustration view of the nose of an aircraft including the aircraft control center of FIG. 1, according to an exemplary embodiment.

In FIG. 2A, the front of an aircraft is shown with aircraft control center 10 and nose 100, according to an exemplary embodiment. A radar system 102 is generally located inside nose 100 of the aircraft or inside a cockpit of the aircraft. According to other exemplary embodiments, radar system 102 may be located on the top of the aircraft or on the tail of the aircraft. Radar system 102 may include or be coupled to an antenna system.

Figure 2B:
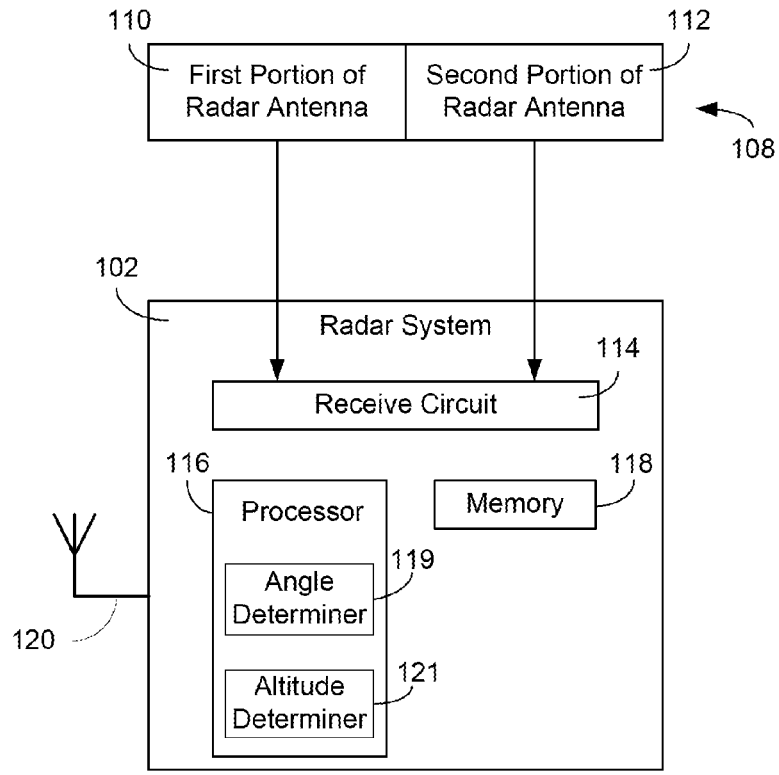
FIG. 2B is a block diagram of a system of receiving and processing radar returns, according to an exemplary embodiment.

In FIG. 2B, radar system 102 is shown in greater detail, according to an exemplary embodiment. Radar system 102 may be coupled to an antenna 108. Antenna 108 may receive radar returns from a target, such as a runway. Furthermore, the radar system 102 may also include a wireless transceiver 120 for wireless communications. The wireless transceiver 120 may use one or more communication protocols, including but not limited to satellite, cellular, FM, AM, WiFi, or other RF communications. The wireless transceiver 120 may wirelessly retrieve data as necessary for use by the aircraft radar system 102. System 102 includes an angle determiner 119 and an altitude determiner 121.

Determiners 119 and 121 are preferably embodied as software routines. Determiners 119 and 121 use either vertical or horizontal sweeps or both types of sweeps to reliably produce a local altitude estimate of the runway threshold. This measurement can be used as a real time source for confirmation or adjustment of other altitude sources.

In one exemplary embodiment, the location of the aircraft and the runway is determined. The locations of the aircraft and runway are used to aim a radar beam at the runway. The location of the aircraft can be determined by various equipment such as the flight management system (FMS), GPS, inertial navigation, etc. The location of the runway can be stored on the aircraft or received as data or audibly via a radio. In a preferred embodiment, the locations can be used to determine the range to the runway. The runway location can be stored in a runway database. Alternatively, the range to the runway can be determined using radar, or other landing aid equipment.

In an exemplary embodiment, the radar returns received by radar antenna 108 associated with radar system 102 can be separated into two or more portions 110 and 112, and can be used to determine an angle from system 102 to a target or a vector from system 102 to a target such as a runway. The vector can be represented as an angle (boresite angle) and range to the runway. Various processes can be utilized to calculate the angle or vector to the runway. In one embodiment the angle is expressed as a tilt angle and an azimuth angle. Sub-aperture techniques can be utilized to determine the tilt angle and azimuth angle. The vector and an altitude of the runway are used to determine the altitude of the aircraft (preferably, during final phase of flight).

A high angle resolution process produces angles normal to the angle of separation between portions 110 and 112. According to one embodiment, a full/half separation allows angle estimates to be made. A separation in the vertical dimension allows high resolution in that vertical direction. A separation in azimuth allows high resolution in that azimuth direction according to another exemplary embodiment.

According to one exemplary embodiment, a half aperture (or switched aperture) method may be used to sense terrain height. Radar system 102 of the aircraft may operate through radar antenna 108 that toggles between transmitting and receiving on the full aperture and transmitting on the full aperture while receiving on the half aperture. The received signals may be processed to determine a high resolution estimate of a target angle relative to the boresite of the antenna beam. According to an exemplary embodiment, the signals may be processed using a complex conjugate multiplication method to determine the target angle. The method is related to sequential lobing but is executed in the phase domain as opposed to the common amplitude domain.

The method may be used in terrain altitude estimation systems. The method, according to one exemplary embodiment, may be 10 to 15 times more accurate than methods commonly used in monopulse terrain following and terrain avoidance systems.

Figure 2C:
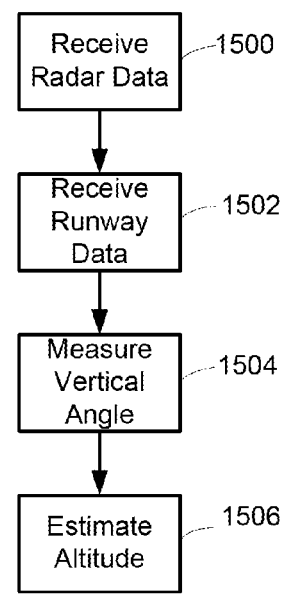
FIG. 2C is a flow chart of a process for determining altitude, according to an exemplary embodiment.

Referring to FIG. 2C, a flow diagram for an altitude estimation method is shown. System 102 preferably utilizes known locations of the runway and the aircraft to point radar antenna 108 to the runway. In step 1500, the method may receive radar data such as radar returns. The radar data from step 1500 may include data from vertical and/or horizontal radar sweeps. In step 1502, the method may receive runway data. The runway data may be retrieved from memory 118 and/or from a wireless transceiver 120. Alternatively, the altitude of the runway may be known and stored in a database. Furthermore, runway data such as relative position can be obtained via an instrument landing system (ILS) or microwave landing system (MLS). The location of the aircraft may be used to identify the runway entry. In step 1504, the method may measure the vertical angle to a point, for example a runway. When runway data from step 1502 and the angle from step 1504 are available, the method may estimate the aircraft's altitude in step 1506. In a preferred embodiment, the range is determined from non-weather radar sources. The range is preferably determined from aircraft location and runway location. The altitude in step 1506 may be estimated by calculating the sum of the runway altitude received in step 1502 and the aircraft's relative altitude from the runway at step 1504. Therefore, the aircraft's altitude may be more accurately estimated using conventional aircraft systems adapted to perform the advantageous process described herein.

Referring to FIG. 2D, a flow diagram for an altitude correction and/or calibration method is shown. In step 1600, the method may receive radar data such as altitude information. The radar data from step 1600 may include data from vertical and/or horizontal radar sweeps. The method may receive runway data in step 1602. The runway data may be retrieved from memory 118 and/or from a wireless transceiver 120. Additionally, the runway data may be obtained via an ILS or MLS system. The vertical angle between the aircraft and a point such as a runway may be measured in step 1604. In step 1606, the method may estimate the aircraft's altitude. The aircraft's altitude may be estimated by summing the runway altitude received in step 1602 with the relative altitude between the aircraft and a point. The relative altitude is calculated with the vertical angle that is measured in step 1604 and the range between the aircraft and a point. The altitude estimated in step 1606 may then be used in step 1608 as a reference altitude to confirm or adjust measurements of other devices, for example a pressure based sensor, a barometer, an inertial navigation system or GPS. A barometric altitude measurement may be accurate to 75 feet of the actual altitude. The estimate may be accurate to ten feet and used to correct the measurement. Furthermore, the method of FIG. 2D may be employed using conventional aircraft systems. In a preferred embodiment, the angle to the point on the runway is estimated according to one of the sub-aperture processes discussed below. However, other angle estimation techniques can be utilized. The range to the runway can be determined according to any radar return process for determining range or from other aircraft equipment capable of providing range to a runway or relative position between the aircraft and the runway. In one embodiment, the time between transmission and reception of the beam is used to determine range. The range and the angle are used to calculate relative altitude to the runway using trigonometric techniques.

Referring to FIG. 2E, a flow diagram for an altitude estimation method is shown. The method may perform a radar sweep 1700 of an area. The radar sweep may be a horizontal radar sweep or a vertical sweep. When the radar return is received 1702, the method may estimate the relative altitude to the runway in step 1704 based on the data received in step 1702. In step 1706, the method may access memory 118 rather than via the transceiver 120 to obtain runway data, for example an absolute altitude of the runway. Additionally, the method may use an ILS or MLS system to obtain runway data in step 1706. In step 1708, the method may estimate the altitude of the aircraft using the relative altitude estimated in step 1704 and the data retrieved from memory in step 1706. The altitude estimated in step 1708 is based upon the sum of the relative altitude estimated in step 1704 and the altitude retrieved in step 1706. Therefore, a more accurate estimate of the aircraft's altitude may be obtained than with conventional aircraft systems. Furthermore, the altitude estimated in step 1708 may be accurate enough to be used in a synthetic vision aided landing.

The method of FIG. 2E may be employed in an aircraft radar system including a terrain awareness warning system that employs a terrain database. Additionally, the method may be employed without the use of additional equipment and/or airport specific augmentation systems. The estimate from step 1708 may also confirm or adjust measurements from other altitude measurement sources.

Figure 2F:
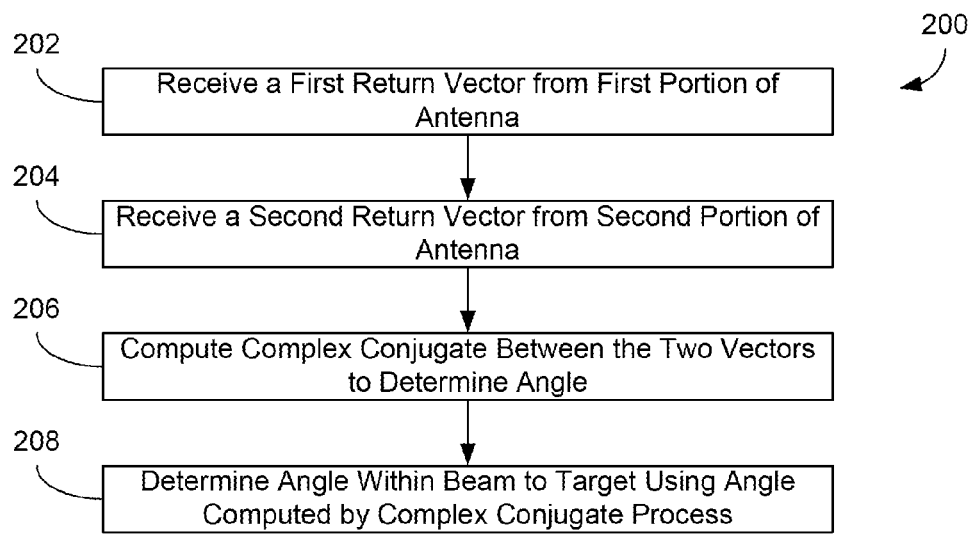
FIG. 2F is a flow diagram of a method of determining an angle within the beam to a target, according to an exemplary embodiment.

In FIG. 2F, radar system 102 is shown in greater detail, according to an exemplary embodiment. Radar system 102 is coupled to an antenna 108 that includes a first portion 110 of the antenna and a second portion 112 of the antenna. Antenna 108 may receive radar returns from a target. In an exemplary embodiment, the radar returns received by radar antenna 108 associated with radar system 102 can be separated into two or more portions 110 and 112. First portion 110 of the returns may relate to data from one area, while second portion 112 of the returns may relate to a second area. For example, second portion 112 may be a bottom half or top half of the antenna. As another example, second portion 112 may be any half of the antenna, or other sized portion of the antenna. Similarly, first portion 110 can be the entire antenna or other sized portion. According to one exemplary embodiment, second portion 112 includes first portion 110. Returns from first portion 110 are associated with a half aperture and returns from second portion 112 are associated with a full aperture.

A high angle resolution process produces angles normal to the angle of separation between portions 110 and 112. According to one embodiment, a full/half separation allows angle estimates (tilt angle) to be made. A separation in azimuth allows high resolution in that azimuth direction according to another exemplary embodiment.

According to one exemplary embodiment, a half aperture (or switched aperture) method may be used to determine a vector to a target such as a runway. Radar system 102 of the aircraft may operate through radar antenna 108 that toggles between transmitting and receiving on the full aperture and transmitting on the full aperture while receiving on the half aperture. The received signals may be processed to determine a high resolution estimate of a target angle relative to the boresite of the antenna beam. According to an exemplary embodiment, the signals may be processed using a complex conjugate multiplication method to determine the target angle. The method is related to sequential lobing but is executed in the phase domain as opposed to the common amplitude domain.

The method may also be used in terrain altitude estimation systems. The method, according to one exemplary embodiment, may be 10 to 15 times more accurate than methods commonly used in monopulse terrain following and terrain avoidance systems.

According to other exemplary embodiments, the first and second portion may be a bottom half, a top half, a left half, a right half, or a whole of the antenna. For example, the first portion may relate to transmitting on any fraction of the full aperture (sum) and the second portion may relate to a half aperture. The present invention is not limited to half aperture techniques and applies any technique that uses fractional apertures. As another example, the first portion may relate to a half aperture and the second portion may relate to a full aperture. As yet another example, both the first portion and second portion may be either a full aperture or half aperture. Any combination of the first portion and second portion that gives an apparent change in the phase center may be used. The first portion is preferably not identical to the second portion. The first portion can intersect, include, or be exclusive of the second portion.

According to various embodiments, combinations of portions can use the reciprocal nature of the radar process of system 102 to exchange fractional aperture selection from transmit to receive operations. According to such an embodiment, the received phase center is effectively moved. While one embodiment shows reception on a full aperture with a mixed transmission of full and half apertures, other sub-aperture selections on reception and transmission are possible.

A first pulse may be provided before sampling the first returns associated with first portion 110, and a second pulse may be provided before sampling the second returns associated with second portion 112. This cycle of pulse and returns can be repeated. The first and second pulses can be full aperture pulses. The full aperture receive data may be used to allow full aperture and half aperture data to be separated.

According to one embodiment, a full aperture coded pulse may be provided for the first data and a half aperture coded pulse may be provided for the second data. The first data and second data received may be associated with full aperture received data, according to an exemplary embodiment. According to another exemplary embodiment, a one third aperture may be used instead of a half aperture. According to yet another exemplary embodiment, a two thirds aperture may be used instead of a half aperture. According to yet other exemplary embodiments, the aperture may be separated in various ways other than a top half and a bottom half or a left half and a right half, and the aperture may be separated unevenly (e.g., not in two halves).

Radar system 102 may include a receive circuit 114 or other circuit configured to receive first data from first portion 110 and second data from second portion 112 and to provide the data to processor 116. In this embodiment, the first data and second data are associated with the first and second portion, respectively, because the first data and second data are derived from returns received by the first and second portion, respectively. Alternatively, the first data and second data can be associated with the first and second portion, respectively, because the first data and second data are derived from returns associated with transmissions from the first and second portions, respectively. According to various exemplary embodiments, processor 116 can be any hardware and/or software processor or processing architecture capable of executing instructions and operating on data related to the radar returns.

According to one exemplary embodiment, the first data and second data may be derived from coded radar pulse transmissions. According to another exemplary embodiment, coding is not required. For example, one system may transmit on the sum and receive on the sum, followed by an independent transmit on the sum and receive on the half aperture, where the pulse sample time does not overlap. Therefore, coding is not required for the transmissions. In "busier" radars, the limited scan time may lead to overlapping of sampling the different portions of the aperture, therefore requiring the use of different coded transmissions.

The radar system may include a processor 116 or other circuitry to estimate the angle to a target relative to the antenna steering angle (i.e., the angle within the beam to the target), using the returns from the first portion and returns from the second portion. Referring to FIG. 2C, a method 200 for estimating the angle to a target is shown, according to an exemplary embodiment. A first return vector from the target is received from the first portion 110 of the antenna (step 202) and a second return vector from the target is received from the second portion 112 of the antenna (step 204). The first and second phases are processed together by multiplying the first vector by the conjugate of the second vector. The phase of the conjugate product is determined as a result (step 206). The resultant phase of the conjugate multiplication process is used to determine the angle within the beam to the target (step 208). The determined angle may be representative of a phase difference associated with first return vector received on the first portion 110 of the antenna and second return vector received on the second portion 112 of the antenna. The method 200 can be repeated to determine the angle in an azimuth direction if the determined angle is in the vertical direction.

According to one exemplary embodiment, a third return vector from the target from first portion 110 of the antenna may be received. Additionally, a fourth return vector from the target from second portion 112 of the antenna may be received. An angle within the beam to the target may be calculated using the first return vector, second return vector, third return vector, and fourth return vector. A third pulse may be provided before sampling the third returns, and a fourth pulse may be provided before sampling the fourth returns.

Figure 3:
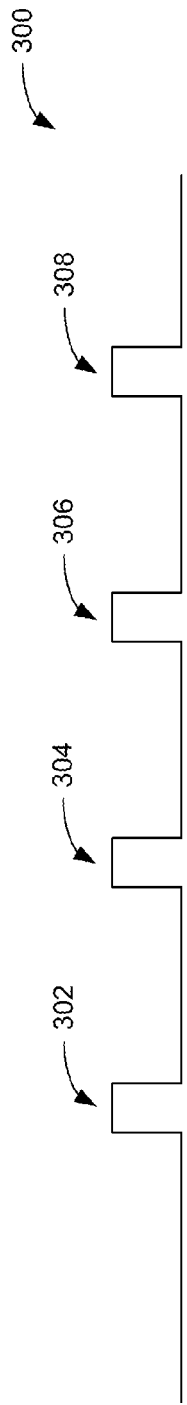
FIG. 3 is an illustration of a pulse beam, according to an exemplary embodiment.

Referring to FIG. 3, a pulse beam 300 illustrating a system of sequential lobing with a half-aperture antenna is shown, according to an exemplary embodiment. Pulse beam 300 illustrates a four pulse high resolution pattern. As discussed above, although half-aperture is described, other sub-aperture sizes are possible and such sizes can be on the receive or transmit side. According to other exemplary embodiments, a three pulse pattern may be used, or other configurations may be used. The system "shuts off" half of the aperture half of the time. The system may transmit on the sum (e.g., full aperture) and receive on the sum (pulse 302, e.g., portion 110). The system may then transmit on the sum and receive on one-half of the aperture (pulse 304, e.g., portion 112). The next pulse of the system may transmit on the sum and receive on the sum (pulse 306, e.g., portion 110), followed by transmitting on the sum and receiving on one-half of the aperture (pulse 308, e.g., portion 112).

The one-half of the aperture being received on in pulses 304 and 308 are the same halves, according to an exemplary embodiment. An upper half, lower half, left half, or right half of the aperture may be chosen.

Figure 4:
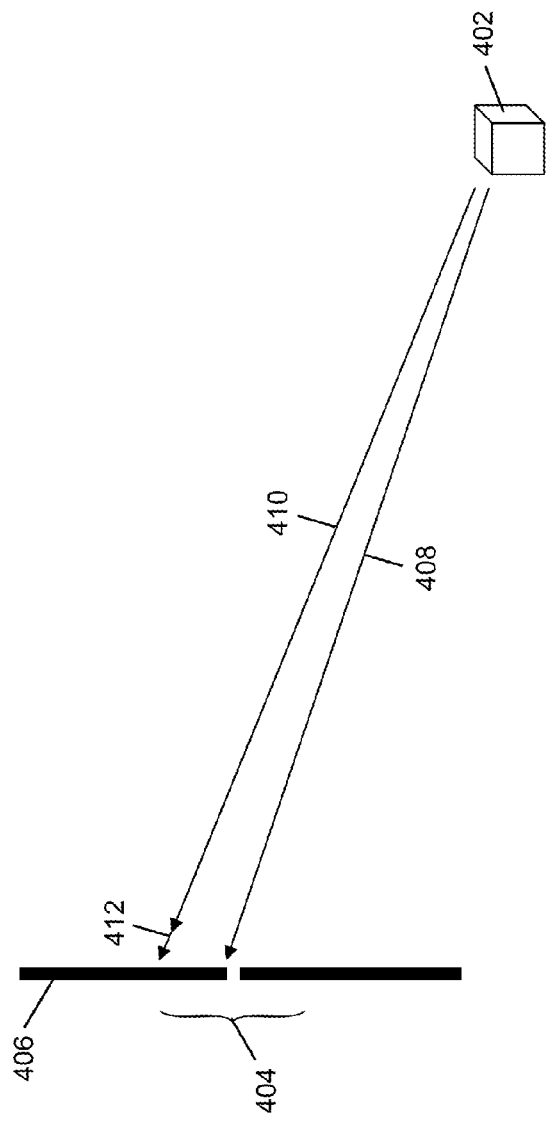
FIG. 4 is an illustration of a target and the distance between a target and full aperture and target and half aperture, according to an exemplary embodiment.

During the various pulses 302-308, the phase center of the antenna changes. The phase center data may be processed and used to produce phase steering information for the radar system. Referring now to FIG. 4, an illustration of the difference in phase center between a full aperture and half aperture is shown. The distance 408 from target 402 to the center of full aperture 404 is different than the distance 410 from target 402 to the phase center of half aperture 406 (the upper aperture). The distance difference produces a phase difference that may be measured to estimate the angle to the target (e.g. runway) relative to the antenna surface.

Distance 412, shown added to distance 410, represents the difference in distances 408, 410. Distance 412 is a vector that represents the phase difference used to estimate the angle to the target relative to the antenna surface. Method 500 of FIG. 5 illustrates a method of determining the angle.

According to one preferred exemplary embodiment, phase processing may be used to calculate the angle to a target relative to the antenna pointing angle or beam angle. The phase processing uses the first data and the second data obtained by sequential lobing in a half-aperture antenna radar system (e.g., radar system 102). By mathematically combining individual sub-aperture responses with complex conjugate multiplications instead of detecting individual sub-aperture responses, the accuracies that result exceed the accuracies produced by a monopulse system. According to an exemplary embodiment, the system may provide angle estimates with standard deviations less than the beamwidth divided by fifty instead of the beamwidth divided by ten for monopulse systems. According to another exemplary embodiment, the standard deviations may be in the range of one hundredth to one hundred fortieth of a real beamwidth. The terrain or target angle estimation performed with better accuracy may allow the radar system to be defined with both good detection characteristics and low false alarm characteristics.

In sequential lobing, two antennas that are close to the same place may be used, going back and forth between the two antennas. An amplitude signature or phase signature that varies between the two halves of the antennas may be used to obtain data about target position for detected targets (e.g., an object such as other aircraft, terrain, towers, etc.). Sequential lobing generally does not use phase comparisons with moving targets due to Doppler-induced phase changes that contaminate the phase center measurement. However, using a complex conjugate multiply method allows the Doppler-induced phase changes to be removed by cancellation. Therefore, a change in phase center between a sum beam and a half beam may be determined.

Figure 5:
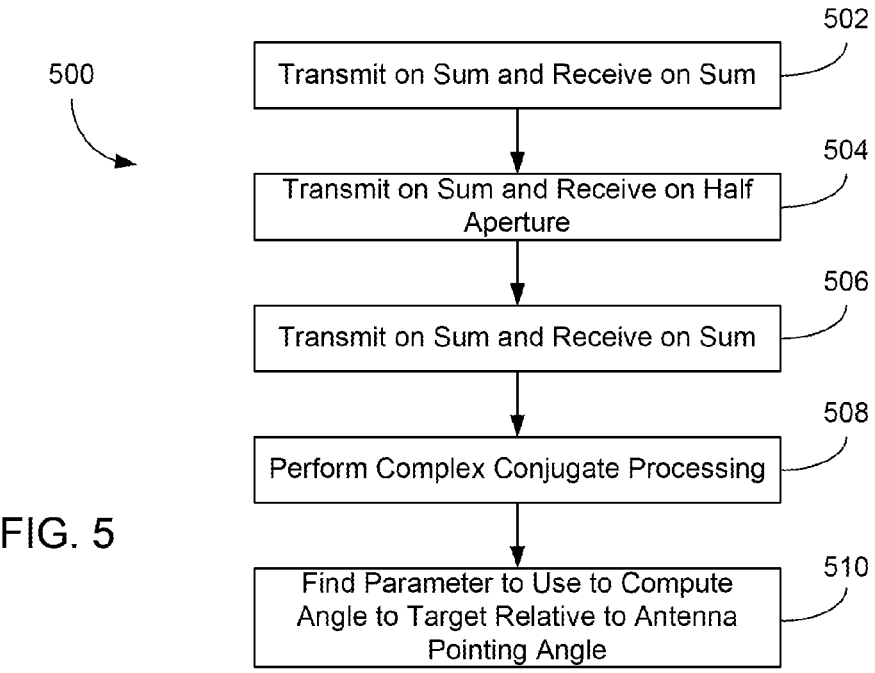
FIG. 5 is a flow diagram of a method of finding a parameter to use to compute a target angle, according to an exemplary embodiment using at least three pulses.

Referring now to FIG. 5, a flow diagram of a method 500 of finding a parameter to use to compute a target angle is shown, according to an exemplary embodiment.

The first pulse is received (step 502). The system may transmit on the sum beam and receive on the sum beam. A power vector $V_S$ (for the sum beam) and an angle $\phi$ is received. The sampled return from the first pulse may be represented by the equation (in polar coordinates): P1= $(V_s,<(\phi))$. The nomenclature represents a voltage signal associated with the energy of the received return. The voltage signal is expressed as a vector and represents power associated with the radar return. $V_S$ is the magnitude of the vector while $\phi$ is the argument or phase of the vector.

The second pulse is received (step 504). The system may transmit on the sum beam and receive on the half aperture. A half aperture power vector $V_H$ is received (for the half-aperture or upper beam). Also received is the same arbitrary angle $\phi$ of step 502 plus a change in the phase due to movements between the pulses (represented by the variable "PhiDoppler") and a change in the phase due to the shift in the phase center (represented by the variable "PhiOffset"). The change in phase of PhiDoppler is caused by relative movement of the target between the pulses. The sampled return from the second pulse may be represented by the equation:

$P2=(V_H,<(\phi+\text{PhiDoppler}+\text{PhiOffset}))$.

The PhiOffset is the phase difference caused by the distance 412 in FIG. 4.

The third pulse is received (step 506). The system may transmit on the sum beam and receive on the sum beam. A power vector $V_S$ is received. The power vector received is approximately equal to the power vector received in step 502. The Doppler continues to rotate through because phase changes are being accumulated from the Doppler. For the third pulse, the change in phase due to the Doppler may be doubled compared to the change in the second pulse of step 504. Therefore, the sampled return from the third pulse may be represented by the equation:

$P3=(V_S,<(\phi+2*\text{PhiDoppler}))$.

Mathematics for a three pulse angle within beam with Doppler removal system is described below (e.g., PhiDoppler is cancelled). Three continuous pulses may be used in the estimate process out of any length pulse stream. A value $P_A$ may be found by multiplying P1 times the conjugate of P2 (the first and second pulse):

$P_A=P1*\text{conj}(P2)=(|V_S|*|V_H|,<(-\text{PhiDoppler}-\text{PhiOffset}))$.

A value $P_B$ may be found by multiplying P2 times the conjugate of P3 (the second and third pulse): $P_B=P2*\text{conj}(P3)=(|V_H|*|V_S|,<(-\text{PhiDoppler}+\text{PhiOffset}))$.

A value $P_C$ may be found by multiplying $P_A$ times the conjugate of $P_B$:

$P_C=P_A*\text{conj}(P_B)=(|V_H|^2*|V_S|^2,<(2*\text{PhiOffset}))$.

In the previous equation, for the angle component of $P_C$, the values for $\phi$ and PhiDoppler cancel out, and the only variable of the angle component remaining is two times the phase center shift. The variable PhiOffset may be solved for using the equation $$\text{PhiOffset} = \left(\frac{1}{2} * \arctan(P_c)\right).$$

The PhiOffset value of the angle component may be used as a parameter for computing the angle to target relative to the antenna pointing angle (step 510). The phase shift is a direct function of the steering angle inside the real beam. For example, for a 12 inch antenna operated at 9.3 GHz, in the value of the phase of $P_C$, 10 degrees of phase shift represents one degree of target angle change. In other words, for every degree by which the phase change is off, the beam center is off by $\frac{1}{10}^{th}$ of a degree (e.g., $\frac{1}{10}^{th}$ of a degree from normal to the surface of the antenna). This may be represented by the equation: PhiBeam=PhiOffset÷10, where PhiBeam is simply the target angle change.

Still referring to step 510, the output of the set of conjugate multiplications of step 510 produces a scaled version of the angle from the antenna pointing angle (the angle references to a vector normal to the surface of the antenna flat plate). Once scaling (via multiplication) is performed, the antenna pointing angle may be added to produce the angle to the target. If the antenna pointing angle is referenced to the local horizon (e.g., ground), the final angular value provided by method 500 is the angle within the beam to the target referenced to the local horizon.

The resultant vector of the multiplications of step 508 is in a full rectangular form, which allows the vector to be in a usable form to allow coherent integration with similar vectors. Coherent integration is the addition of multiple vector estimates to produce a better final estimate. In typical monopulse systems, averaging is done incoherently, with the multiple angle arguments of a vector that represents target phase being averaged. The averaging process produces a best-case reduction in the standard deviation of the resulting angle by the square root of the number of samples averaged. One advantage of the present method is that coherent integration is possible for the estimated angles instead which produces a best case reduction in the standard deviation of the estimated angle of N, where N is the number of samples coherently averaged together. Coherent integration provides an advantage is that the angle may be improved by the number of samples integrated. The removal of the Doppler induced phase allows the coherent integration to be possible. For example, for a pulse stream of 30 pulses in a three-pulse system, 10 independent vectors are formed using the equation for $P_c$. Errors caused by noise are therefore reduced by a factor of up to 10 compared to a single estimate.

Coherent integration may additionally allow for glint (e.g., angle noise) reduction. For complex targets, larger returns from the targets have smaller multi-target cancellations and less glint. Radar can cause transmitter frequency changes to produce radar return samples that are relatively independent. Selecting the largest returns while changing transmitter frequencies allows targets with the smallest target glint to be selected. Coherently averaging the rectangular power squared terms that are a product of the half-aperture (or other) process reduces the influence of returns that are small and likely to have substantial glint. See, Skolnik, *Introduction to Radar Systems* (McGraw Hill Book Company, New York, 2001, 3rd edition) pages 234-236.

A Doppler estimate may be calculated via vector multiplication using the equations for $P_A$ and $P_B$: $P_D = P_A \times P_B = (|V_H^2 * V_S^2| < (2*\text{PhiDoppler}))$. The value of the phase of $P_D$ along with the time between pulses may be used to estimate the local Doppler after the $P_D$ phase is divided by two: Doppler=(phase($P_D$)/2*(2*$\pi$*PRT)), where "PRT" is the pulse repetition time. A two pulse version of method 500 of FIG. 5 requires a Doppler estimate to be available to produce pointing angle estimates within the radar beam, as the Doppler produces an angle error. The Doppler estimate may be obtained from either the radar of the aircraft or from other aircraft equipment. The Doppler estimate may be determined in a variety of ways (e.g., using data regarding the velocity of the aircraft, heading of the aircraft, scan angle of the aircraft, from a system such as a global positioning system (GPS) or otherwise, etc.). The equation for $P_D$ represents one method of generating a Doppler estimate from the radar in a method compatible with the less than full aperture process.

Figure 6:
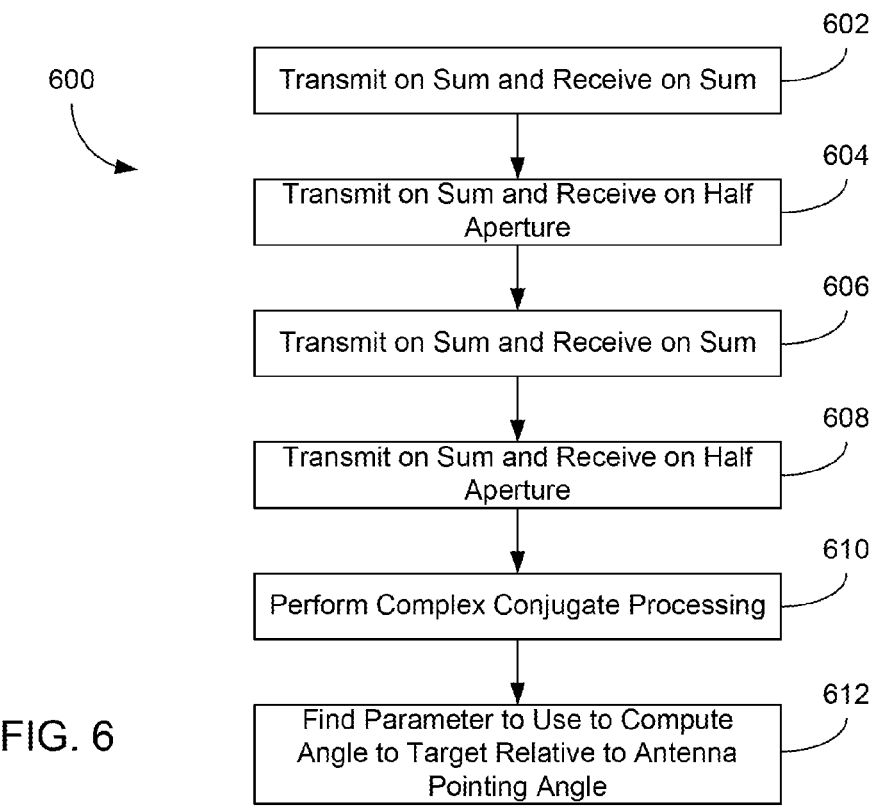
FIG. 6 is a flow diagram of a method of finding a parameter to use to compute a target angle, according to another exemplary embodiment using at least four pulses.

Referring to FIG. 6, a flow diagram of a method 600 of finding a parameter to use to compute a target angle is shown, according to another exemplary embodiment. Method 600 is a four pulse pattern process instead of the three pulse patterns process of method 500 of FIG. 5. The system may transmit on the sum beam and receive on the sum beam (step 602), followed by transmitting on the sum beam and receiving on the half aperture (step 604), followed by transmitting on the sum beam and receiving on the sum beam (step 606) and followed by transmitting on the sum beam and receiving on the half sum beam (step 608). In steps 602-608, equations may be formed as described in steps 502-506 of method 500 of FIG. 5. Using the equations, complex conjugate processing may be performed (step 610) as described in step 508 of method 500 of FIG. 5, and a parameter to use to compute the angle to target relative to the antenna pointing angle is found (step 612), as described in step 510 of method 500 of FIG. 5.

The fourth pulse may be similar to the second pulse, except the Doppler continues to rotate. For the fourth pulse, the change in phase due to the Doppler may be tripled compared to the change in the second pulse of step 504. The sampled return from the fourth pulse may be represented by the equation:

$$P4 = (V_H, |(\phi + 3*\text{PhiDoppler} + \text{PhiOffset})).$$

The four pulses of steps 602-608 may be closely spaced such that high correlation between the pulse returns is maintained.

Complex conjugate processing may be performed (step 206, step 508 and step 610). The above descriptions are for two pulse systems, three pulse systems and four pulse systems. The two pulse method 200, the three pulse method 500 and the four pulse method 600 and associated system 102 can be configured for systems that use from two pulses to N pulses where N is a large number.

According to one exemplary embodiment, in the methods 500 and 600 of FIGS. 5-6, the transmitting function may be toggled between a half aperture (or other fraction) and full aperture instead of the receive function. For example, in method 500 of FIG. 5, the system may transmit on the sum beam (step 502), followed by a transmit on the half aperture (step 504), and a transmit on the sum beam (step 506), while the system receives on the sum beam in all three pulses. In accordance with another exemplary alternative embodiment, data associated with the pulses can be sets of data associated with pulses.

Figure 7:
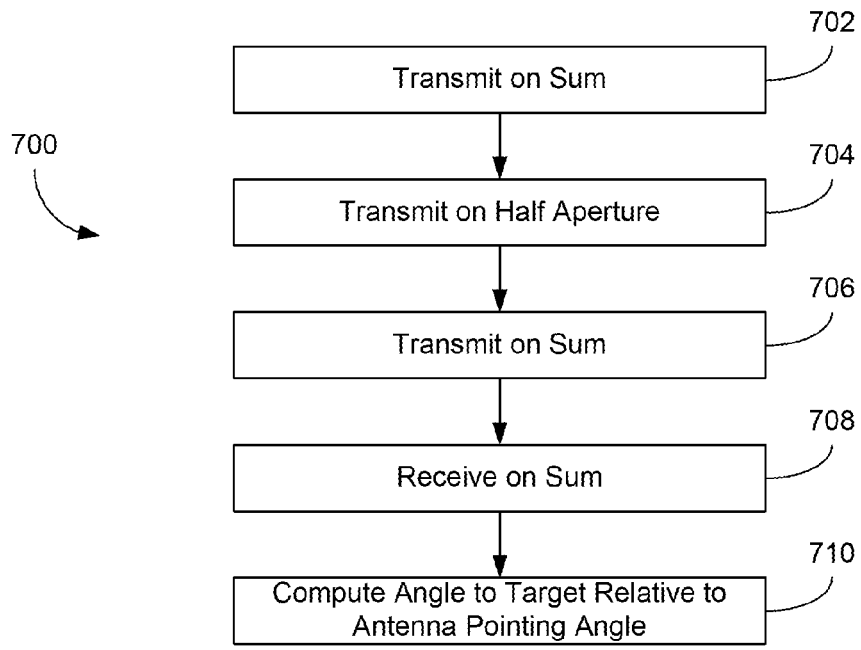
FIG. 7 is a flow diagram of a method of applying a pattern of three coded pulses to a radar to use to compute a target angle, according to an exemplary embodiment.

Referring to FIG. 7, a flow diagram of a method 700 of applying a three pulse pattern to a radar (e.g., a weather radar such as a MultiScan® radar system as manufactured by Rockwell Collins, Inc.) is shown, according to an exemplary embodiment. The system may transmit on the sum (step 702), transmit on the half aperture (step 704), and transmit on the sum (step 706). The three pulse lengths may be 25 microseconds long, according to one exemplary embodiment. The system may receive on the sum (step 708). The receive information is convolved with the three pulse codes in parallel to recover the three individual responses to the three pulses. The antenna pointing is approximately the same for all three pulses, and the radar target will not decorrelate over the time period (e.g., 75 microseconds) across the transmit set. The target angle may be calculated using the data received (step 710). The calculations may be similar to those of steps 508 and 510 of method 500 of FIG. 5.

Figure 8:
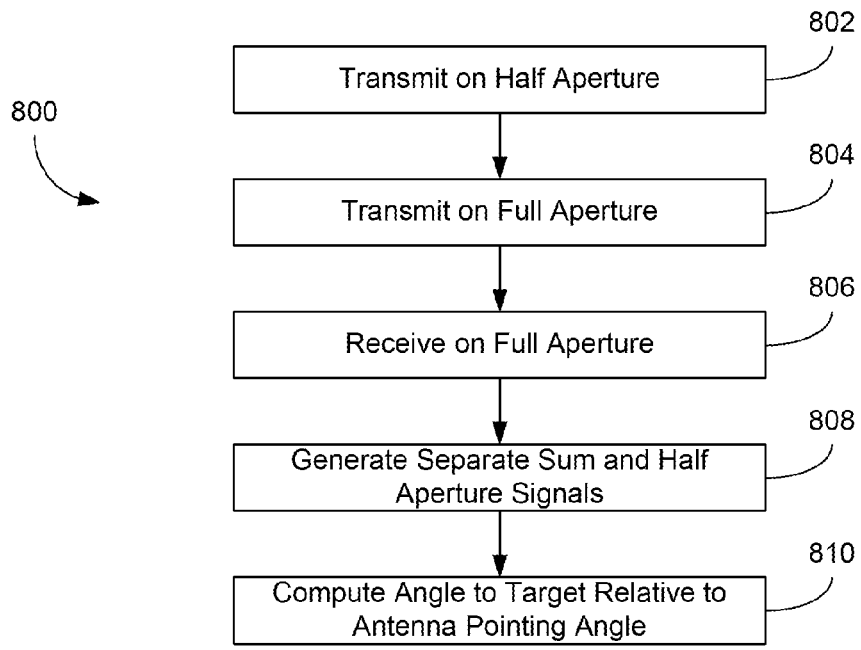
FIG. 8 is a flow diagram of a method of applying a pattern of two coded pulses to a radar to use to compute a target angle, according to an exemplary embodiment.

Referring to FIG. 8, a flow diagram of a method 800 of half aperture usage in a radar is illustrated, according to an exemplary embodiment. In method 800, a two pulse pattern may be used instead of the three pulse pattern of method 700 of FIG. 7. Method 800 may be used in cases where the Doppler is known and only two pulses are needed to calculate the angle to target. The system may transmit on the half aperture (step 802) and transmit on the full aperture (step 804) before receiving on the full aperture (step 806).

For each transmission and reception (e.g., the two pulses in method 800), there is a phase code or frequency code. The codes or frequencies can be chosen to produce low cross-correlations between codes or frequencies. If the time between the two transmissions is short, the cross correlation between the codes is low. Therefore, separate sum and half aperture responses may be generated (step 808) from the response of step 806. The received response of step 806 may be processed with two separate codes allowing responses from the half aperture and full aperture to be distinguished and separated. The analysis as described in FIG. 8 may then be used to compute an angle to target relative to the antenna pointing angle (step 810). The calculations may be similar to those of steps 508 and 510 of method 500 of FIG. 5.

The use of a target phase in a radar process allows the ability to avoid a lengthy filtering process that is used to produce estimates of power return between antenna sweeps taken at different elevations when target elevation is used to separate targets, such as weather from ground. The two pulses may be used to make an angle measurement in flight as the pulses are correlated.

The less than full aperture method as disclosed may be used for the detection of a plurality of targets. Land, terrain, other aircraft, military targets, towers, etc., may be objects that may be detected. For example, the less than full aperture method may be used to detect the top of radio towers. As another example, the less than full aperture method may be used to detect the top of precipitation as well.

Figure 9:
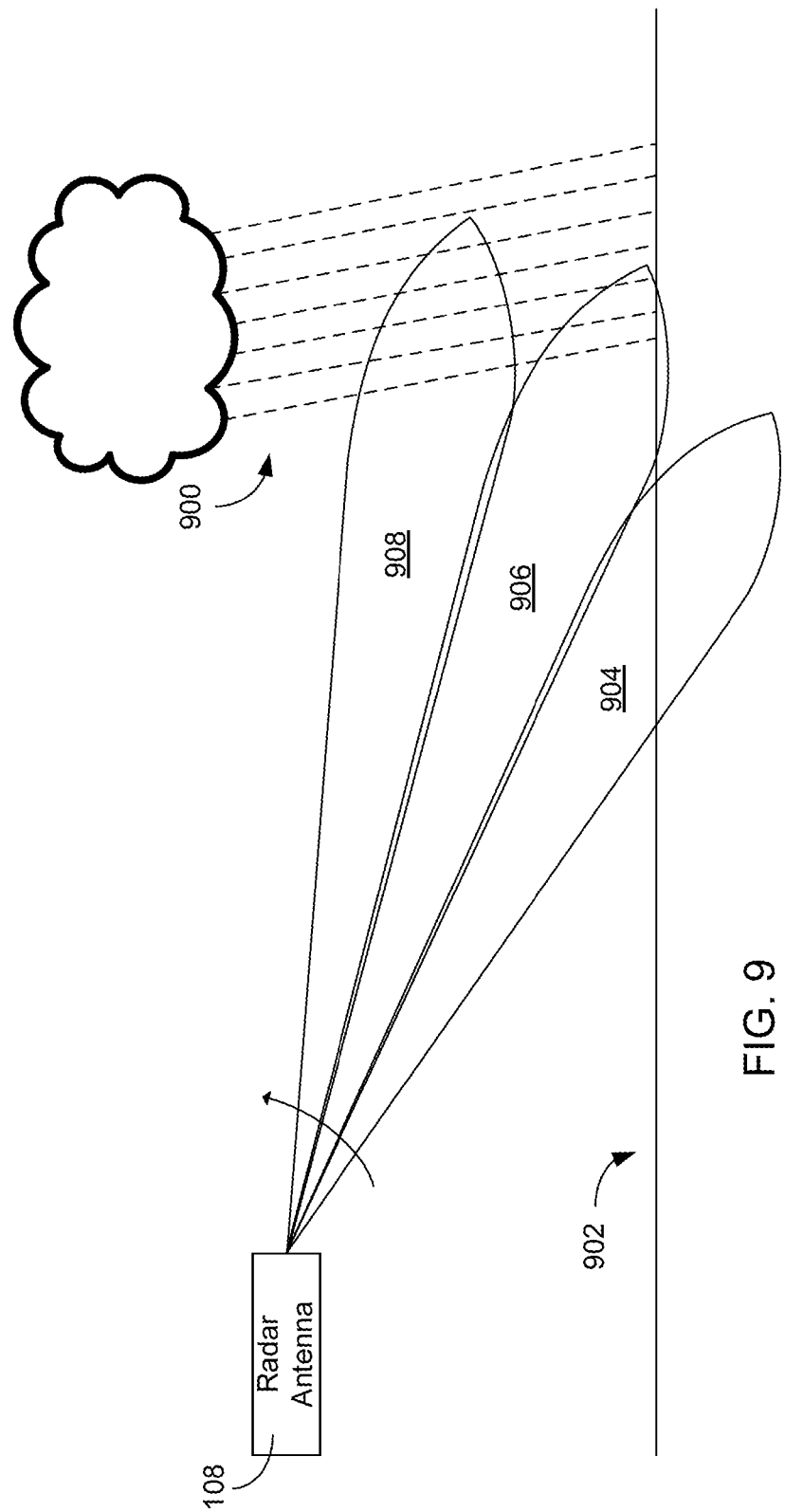
FIG. 9 is a view of an aircraft mounted radar vertically sweeping across ground and weather conditions, according to an exemplary embodiment.

Referring now to FIG. 9, an illustration of a radar antenna 108 and vertical sweeping is shown, according to an exemplary embodiment. In the embodiment of FIG. 9, weather conditions 900 is illustrated as precipitation and terrain 902 is shown. Vertical sweeping may be used in conjunction with coherent integration. An antenna may vertically sweep (e.g., sweep from low to high) and the conjugate products (as determined using method 500 of FIG. 5) across the beam may be averaged. The averaging may be done either with or without focusing. Without focusing, the complex conjugate products are added. With focusing, the complex conjugate products are compensated by phase change over the beam by multiplying each complex conjugate by a local unit vector representing the phase of the antenna conjugate process at the approximate antenna sample angles. Focusing is discussed in more detail below with reference to FIGS. 12-14.

According to one exemplary embodiment, a small number of three pulse sets (e.g., a "block") may have a common transmit frequency, followed by changing the transmit frequency (i.e., by more than a value of 1 over the pulse length) and sampling a next block of returns. The terms produced by the conjugate process may be coherently summed.

Radar antenna 108 may sweep vertically in a range from area 904 to area 908. As radar antenna 108 vertically sweeps across area 904, the radar detects ground objects. As radar antenna 108 vertically sweeps across area 904 into area 906, weather targets may begin to be detected. Detected ground targets occupy high gain locations in the beam compared to the weather targets, which occupy very low gain locations. Angle data from these areas 904, 906 is generally dominated by the phase response from ground targets. As radar antenna 108 vertically sweeps across area 906 into area 908, ground targets begin to drop in return levels while weather targets produce larger returns. Therefore, generally data from area 908 is "contaminated" by weather targets and is generally not useful for ground target estimation.

The radar system connected to the radar antenna 108 may include a processor or other processing devices and/or software that is configured to detect when weather conditions are picked up on the radar returns. Further, the radar system may include the same to remove or discard radar returns affected by the weather conditions. The radar system may then use valid radar returns to determine the angle within the beam to the terrain using the systems and methods as described in the disclosure.

According to one exemplary embodiment, lower one-half beam data may be used to reject weather induced errors that may be the result of vertically sweeping from area 904 to area 908. Data may be integrated together over the lower half of the beam response from ground. The point at which data is no longer used may be determined by an angle constraint (e.g., one-half beam width from where "good" data was last seen by the radar). Alternatively, a maximum power point may be determined and used determine when no longer to use the data.

Figure 10:
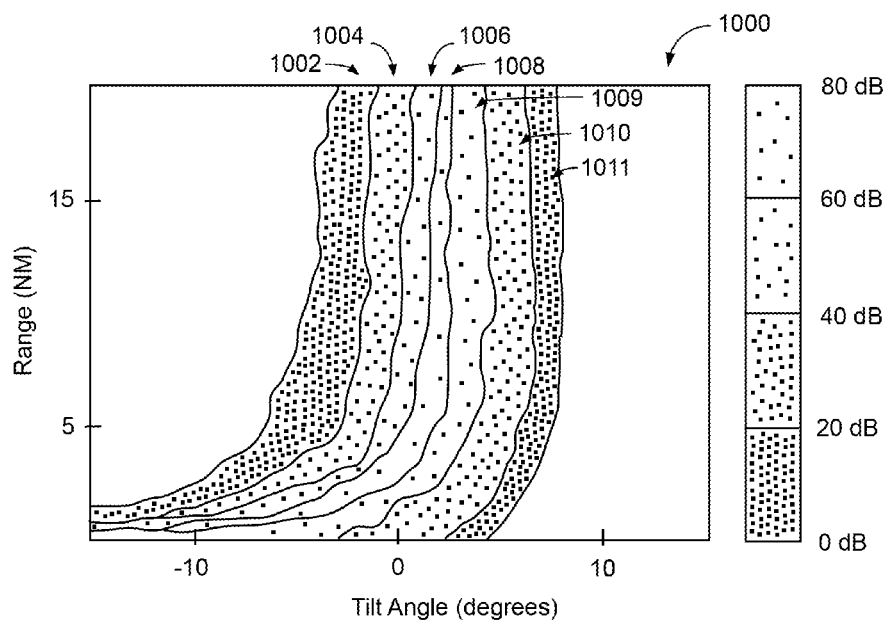
FIG. 10 is a graph of radar return power from the airplane of FIG. 9, according to an exemplary embodiment.

Referring now to FIG. 10, a graph 1000 illustrating vertical sweeping is shown, according to an exemplary embodiment. In FIG. 10, there is no weather interference. The horizontal axis represents tilt angle of the antenna and the vertical axis represents the range. Ground is represented in areas 1002-1011 while there are no returns in the other areas of graph 1000. Areas 1002-1011 are shown broken into sections based on the phase output from the complex conjugate method given the tilt angle and range of the antenna. The difference between areas 1002-1011 may be representative of the phase shift as the antenna tilt angle changes.

Figure 11:
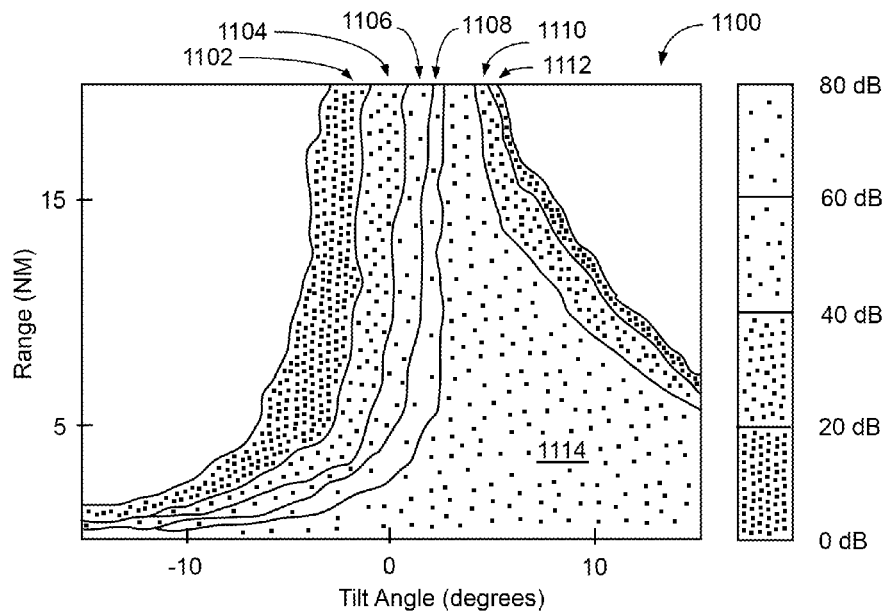
FIG. 11 is a graph of processes phase generated from radar return from the airplane of FIG. 9, including detected weather conditions, according to an exemplary embodiment.

Referring also to FIG. 11, graph 1100 illustrates the addition of weather interference (e.g., rain). Compared to graph 1000, graph 1100 illustrates additional returns (in areas 1110-1114) which are picked up due to the presence of weather conditions, in addition to areas 1102-1108. The maximum height where precipitation is detected is in area 1112 (e.g., where the values range from −40 to −80). In the embodiment of FIG. 10, power levels drop as the antenna is scanned above the ground. However, in FIG. 11, with the presence of precipitation, the power returns from the precipitation override the fading ground returns as the antenna is scanned past the ground. As described and illustrated in FIG. 9, radar returns may be rejected out when the antenna is pointed in area 908 of FIG. 9 (e.g., the returns when the tilt angle is greater than 0 as shown in FIG. 11 are rejected). Radar returns from weather will generally fall from some altitude to the surface of Earth.

According to one exemplary embodiment, the radar may be optimized to detect obstacles such as towers in addition to terrain or ground and weather conditions such as rain. Processing for determining obstacles may be separated from processing for determining terrain. Weather may be separated from terrain as described in FIG. 9, while using shorter transmitter pulses may allow for obstacles to stand out and be separated from weather conditions.

According to one exemplary embodiment, system 102 may detect errors as a self-monitoring system. Response data may be used for self-monitoring. The known amplitude characteristic difference between a full aperture and half aperture may be used to confirm the operation of the radar. Additionally, a constant phase slope as illustrated in graphs 1000, 1100 of FIGS. 10-11 may be used to monitor operations. System 102 may detect a change in power in the data.

According to various exemplary embodiments, the process flows of FIGS. 2C, 5, 6, 7, and 8 may be embodied as hardware and/or software. In exemplary embodiments where the processes are embodied as software, the processes may be executed as computer code on any processing or hardware architecture or in any radar system.

Figure 12:
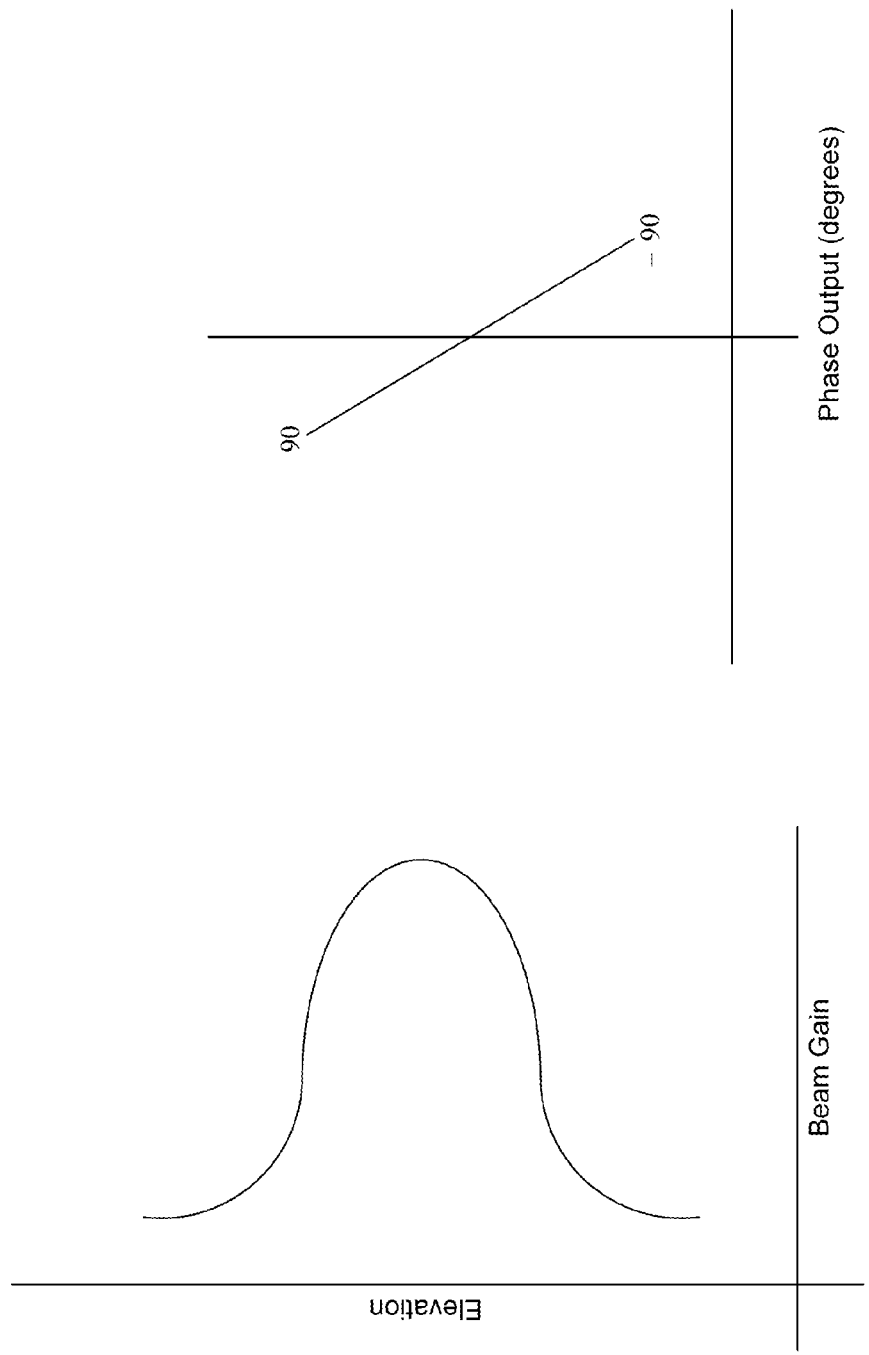
FIG. 12 includes graphs showing elevation versus beam gain and elevation versus complex conjugate phase angle for exemplary returns associated with the system illustrated in FIG. 9.
Figure 13:
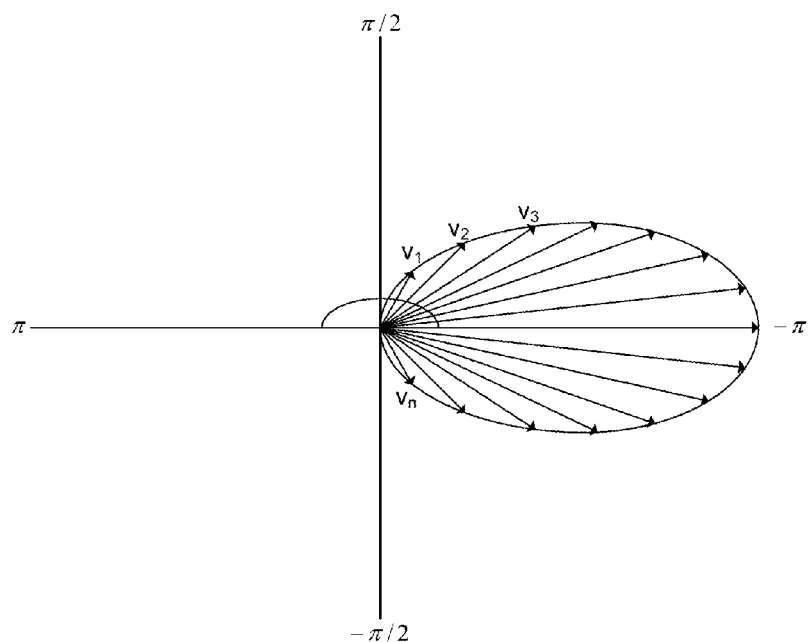
FIG. 13 is a graph showing the response from vertically sampled beams in a polar coordinate arrangement for the graphs illustrated in FIG. 12.
Figure 14:
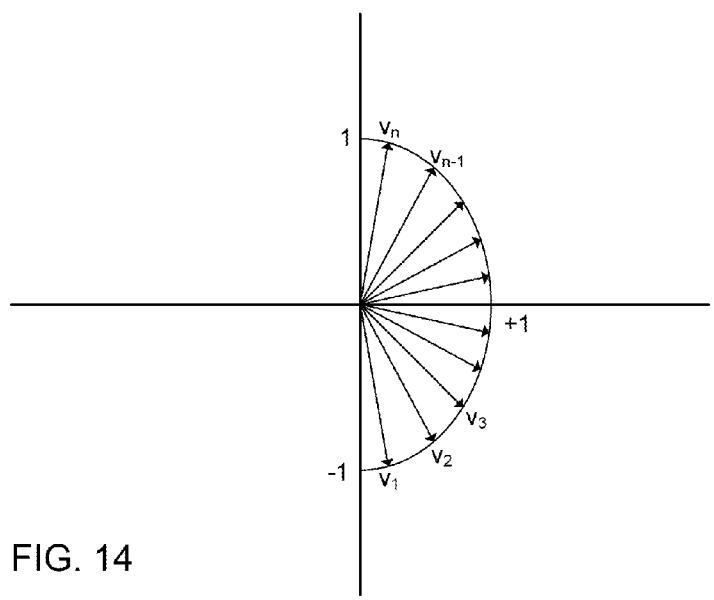
FIG. 14 is a graph showing a focusing vector for the exemplary returns illustrated in FIG. 12.

FIG. 12 shows a first graph of elevation being swept on the Y axis versus a beam gain on the X axis and a second graph showing elevation being swept on the Y axis versus phase output from the conjugate process on the X axis. FIG. 12 shows a relatively linear relationship between the complex conjugate phase output and the elevation angle. FIG. 13 shows individual vectors $V_1$ through $V_n$ representing responses from vertically sampled beams in a polar coordinate arrangement. The vertically sampled beams can correspond to the beam set shown in FIG. 9. With reference to FIG. 14, a focusing vector is shown in polar coordinates.

System 102 can be optimized by using a focusing vector. The fractional aperture multiple conjugate process produces a vector that represents the angle within the beam for a given sample set as given by the equation below:

$$\phi_{InBeam} = K1 \cdot \arg(Vc)$$

where Vc is the output of the three pulse conjugate process, K1 is a factor relating the output of the conjugate process with the angle within the beam, and the term "arg(Vc)" refers to the phase of the vector Vc is in polar form.

The angle to the target is the beam elevation plus the angle within the beam as given by the equation below:

$$\phi_{Tgt} = \text{Elevation} + \text{InBeam}$$

If n samples have been taken, the samples may be averaged together as given by the equation below. If the beam is slewing vertically during the sample time, the local antenna elevation angle is included.

$$\phi_{TgtAvg} = \frac{1}{n} \cdot \left[\sum_{m=1}^{n} \phi_{Elevation_n} + \phi_{InBeam_n}\right]$$

The equation can be organized with a fixed elevation angle, e.g., the center angle of the sample set, and an offset to that angle to represent that set of elevation angles as given by the equation below:

$$\phi_{TgtAvg} = \phi_{ElevCenterOfSamples} + \frac{1}{n} \cdot \left[\sum_{m=1}^{n} \phi_{ElevationOffsetFromCenter_n} + \phi_{InBeam_n}\right]$$

The phase arguments are averaged, that is the individual samples are incoherently averaged to gain a better estimate of the switched antenna/conjugate processed angle which gives a better estimate of the angle to the target. If coherent processes for the inbeam phase estimate are used, the coherently averaged in beam phase can be generally represented by the following equation:

$$\phi_{CoherentlyAvgInBeam} = \arg\left(\sum_{m=1}^{n} Vc_n\right)$$

where Vc is a rectangular complex output from the switched antenna/conjugate process. This compares to the incoherently filtered type of process discussed above and is represented by the following equation:

$$\phi_{IncoherentlyAvgInBeam} = \frac{1}{n} \cdot \left[\sum_{m=1}^{n} (\arg(Vc))\right]$$

If the coherently average samples are achieved, better estimates can be achieved than from an incoherently filtered system. With several caveats, the standard deviation of a set of vectors coherently averaged is reduced by the number of elements averaged together as opposed to a square root improvement in standard deviation which incoherent integration (straight averaging) affords. Accordingly, an estimate of target angle can be coherently built according to the equation below (first separating the summations).

$$\phi_{TgtAvg} = \phi_{ElevCenterOfSamples} + \frac{1}{n} \cdot \sum_{m=1}^{n} \phi_{ElevOffsetFromCenter_n} + \arg\left(\sum_{m=1}^{n} Vc_n\right)$$

According to another embodiment, a goal of gaining reductions in the standard deviation of the target estimate by about n (number of samples) can be achieved. The goal can be achieved by addressing the problem that the Vc vector moves over about +90 to −90 degrees while the target is in view of the beam. Adding samples associated with the extremes of +90 and −90 degrees does not produce the constructive addition, but instead a destructive addition that tends to cancel. The high signal-to-noise movement of the Vc vector over the scan with the elevation offset from the center of the set of samples for each sample can be described by the equation below. K1 is the beam scaling constant introduced in the equation set forth above.

$$\phi VcCausedByElevMovement_n = K \cdot \phi ElevOffsetFromCenter_n$$

With the local movement of the Vc vector, a unit vector with the same movement in preparation to aligning all Vc vectors can be produced according to the following equation:

$$\mu_n = \exp(K2 \cdot j \cdot \pi \cdot \phi VcCausedByElevMovement_n)$$

(exp(x) is an epsilon to the x power function)

By choosing the correct sign for the constant of proportionality, each unit vector $\mu_n$ may have the opposite local movement of the local Vc vector. This allows all the Vc vectors to be aligned according to the following equation:

$$\phi_{TgtAvg} = \phi_{ElevCenterOfSamples} + \arg\left(\sum_{m=1}^{n} \mu_n \cdot Vc_n\right)$$

Preferably, the Vc vectors are focused to be in alignment and coherently integrated.

According to various exemplary embodiments, the process flow and components of FIGS. 1-14 may be embodied as hardware and/or software. In exemplary embodiments where the processes are embodied as software, the processes may be executed as computer code on any processing or hardware architecture or in any radar system.

While the detailed drawings, specific examples, detailed algorithms, and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. For example, the scope of the claims are intended to cover any technique that uses a selectable fractional aperture unless literally delineated from the claims. Furthermore, other substitutions, modifications, changes, and omissions may be made in the design, operating conditions, and arrangement of the exemplary embodiments without departing from the scope of the invention as expressed in the appended claims.

What is claimed is:

1. A method of determining an altitude of an aircraft in response to a runway altitude of a runway and a radar sweep by a radar system, the method comprising:

receiving first data associated with an aircraft position;
receiving second data associated with a runway position and the runway altitude;

receiving third data associated with a radar return from the runway;

determining a range between the aircraft and the runway using the first and second data;

determining a vertical angle between the runway and the aircraft using the third data; and determining the altitude of the aircraft based on the vertical angle, the range, and the runway altitude.

2. The method of claim 1, wherein the aircraft and runway positions are absolute or relative to each other.

3. The method of claim 1, wherein the altitude of the aircraft is referenced to the runway and used directly.

4. The method of claim 1, further comprising:
using the determined altitude of the aircraft to confirm or adjust a sensed altitude of the aircraft.

5. The method of claim 4, wherein the sensed altitude is provided by a pressure-based altitude sensor, a GPS device, or an inertial-based altitude sensor.

6. The method of claim 1, wherein the vertical angle is determined using a sub-aperture technique.

7. The method of claim 1, wherein the radar sweep comprises at least one of a vertical sweep, a diagonal sweep, or a horizontal sweep.

8. An aircraft radar system for an aircraft, comprising:
an antenna configured to receive a radar return from a runway associated with a radar sweep;
processing electronics configured to determine a relative altitude of the aircraft using an angle associated with the radar return and a range between the runway and the aircraft, and
configured to determine a first altitude of the aircraft by summing the relative altitude and an altitude of the runway.

9. The aircraft radar system of claim 8, wherein the first altitude of the aircraft is determined and used directly.

10. The aircraft radar system of claim 8, wherein the radar sweep comprises at least one of a vertical sweep, a diagonal sweep, and a horizontal sweep.

11. The aircraft radar system of claim 8, wherein the first altitude of the aircraft is used to confirm or adjust a sensed altitude.

12. The aircraft radar system of claim 11, wherein the sensed altitude is provided by a pressure-based altitude sensor, a GPS device, or an inertial-based altitude sensor.

13. The aircraft radar system of claim 8, wherein the radar system uses a sub-aperture technique.

14. The aircraft radar system of claim 8, wherein the radar system is a weather radar system.

15. The aircraft radar system of claim 8, further comprising:
a memory configured to store the altitude of the runway and a position of the runway, data associated with the radar return, and/or computer code for the processing electronics.

16. The aircraft radar system of claim 8, further comprising:
a transceiver configured to receive the altitude of the runway and a position of the runway from a remote source.

17. An apparatus, comprising:
means for receiving third data associated with a radar return from a runway; and
means for determining a range between an aircraft and the runway using first data associated with an aircraft position and second data associated with a runway position and a runway altitude, calculating a vertical angle between the runway and the aircraft using the third data, and determining an altitude of the aircraft based on the vertical angle, the range, and the runway altitude.

18. The apparatus of claim 17, wherein the altitude of the aircraft is determined and used directly.

19. The apparatus of claim 17, wherein the altitude of the aircraft is used to confirm or adjust a sensed altitude of the aircraft.

20. The apparatus of claim 19, wherein the sensed altitude is provided by a pressure-based altitude sensor, a GPS device, or an inertial-based altitude sensor.

* * * * *